United States Patent [19]
Böckle

[11] Patent Number: 5,154,538
[45] Date of Patent: Oct. 13, 1992

[54] METHOD AND APPARATUS FOR REMOVING A LIQUID PHASE FLOATING ON A SURFACE OF GROUNDWATER

[75] Inventor: Rüdiger Böckle, Griesheim, Fed. Rep. of Germany

[73] Assignee: Preussag Aktiengesellschaft, Hanover, Fed. Rep. of Germany

[21] Appl. No.: 602,315
[22] PCT Filed: Mar. 16, 1990
[86] PCT No.: PCT/DE90/00199
§ 371 Date: Nov. 21, 1990
§ 102(e) Date: Nov. 21, 1990
[87] PCT Pub. No.: WO90/11410
PCT Pub. Date: Oct. 4, 1990

[30] Foreign Application Priority Data
Mar. 22, 1989 [DE] Fed. Rep. of Germany ....... 3909372

[51] Int. Cl.⁵ ............................................. E02B 15/08
[52] U.S. Cl. .................................. 405/128; 210/104; 405/52; 405/60
[58] Field of Search .................... 405/128, 129, 52, 60; 210/109, 104, 242.3, 921, 922, 924, 925; 166/68, 64, 53, 105, 107

[56] References Cited
U.S. PATENT DOCUMENTS

| | | | |
|---|---|---|---|
| 3,745,115 | 7/1923 | Olsen | 210/923 X |
| 4,088,579 | 5/1978 | Yoshioka | 210/108 |
| 4,273,650 | 6/1981 | Solomon | 210/104 |
| 4,945,988 | 8/1990 | Payne et al. | 405/128 |
| 4,974,674 | 12/1990 | Wells | 166/107 |
| 4,983,282 | 1/1991 | Roy et al. | 210/104 X |
| 4,998,585 | 3/1991 | Newcomer et al. | 166/105 |

*Primary Examiner*—Dennis L. Taylor
*Attorney, Agent, or Firm*—Herbert Dubno

[57] ABSTRACT

An assembly for removing a liquid phase floating on a surface of groundwater includes a lifting device changing a position of a bucket-shape vessel receiving the liquid phase through an inlet aperture in response to a signal generated by a measuring device monitoring a level of the liquid phase.

9 Claims, 1 Drawing Sheet

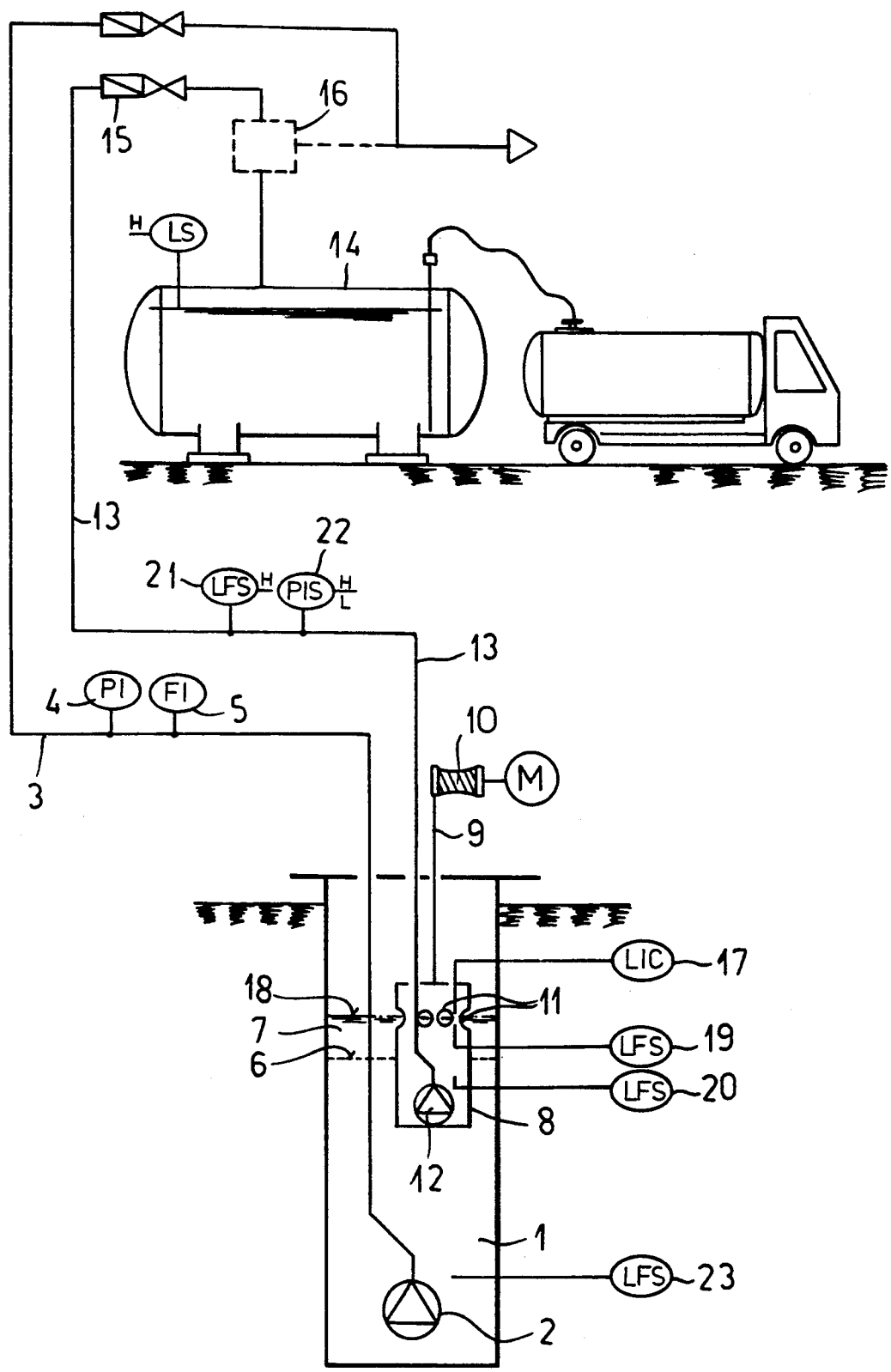

METHOD AND APPARATUS FOR REMOVING A LIQUID PHASE FLOATING ON A SURFACE OF GROUNDWATER

FIELD OF THE INVENTION

My present invention relates to a method of and an apparatus for removing a liquid phase floating on a surface of groundwater.

BACKGROUND OF THE INVENTION

To limit or remedy environmental damage, a problem often recurring in practice is the removal of liquid pollutants such as hydrocarbons which have entered the ground, in order to decontaminate the groundwater. For this purpose, a variety of decontamination methods are known which, however, are all very complex and costly.

In a known method (German published patent application DE-OS 3,721,981), groundwater is drawn from the ground, treated biologically above ground and subsequently returned to the ground, with a flushing stream being produced in the ground causing pollutant discharge. This known method has the disadvantage that removal of the pollutants is effected only indirectly through the flushing stream in dissolved or suspended form, so that large amounts of groundwater have to be pumped up for pollutant removal. As a consequence, the method is time-consuming and costly. It is a further disadvantage of the known method that it necessitates a separation or treatment plant above ground in order to separate the pollutants pumped up together with the water.

OBJECTS OF THE INVENTION

It is an object of the present invention to provide a method by means of which liquid phases floating on a surface of groundwater can be removed within a short period of time and with little effort.

It is a further object of the invention to provide a simple and reliable apparatus for implementing this method.

SUMMARY OF THE INVENTION

According to the present invention, this requirement is satisfied by a method comprising the lowering of the liquid level in a well by continually pumping out groundwater, and the separate withdrawal of the liquid phase floating on the groundwater surface by means of a pump, with a lifting device which is controlled by the liquid level operating to lower the inlet aperture of the pump to a level below the liquid level in the well such that it does not come to lie below the groundwater surface.

The method of the invention enables a liquid phase such as hydrocarbons floating on a groundwater surface to be pumped out separately, thereby utilizing the fact that separation of the liquid phase has already taken place in the region of the ground or in the well. Accordingly, the need to provide special facilities above ground for separating the liquid phase from water is obviated. It is a further advantage of the method of the invention that the delivery rate at which the liquid phase can be pumped out is independent of the replenishment rate of the groundwater and the amount of groundwater delivered, resulting in high delivery rates in the presence of favorable flow properties of the liquid phase.

In the method of the invention, further provisions may include a treatment of the groundwater delivered for lowering the liquid level in the well prior to returning it to the ground, in order to remove pollutants dissolved or suspended in the groundwater. In the method of the invention, this treatment operation can be performed with greater ease and effectiveness because the groundwater no longer contains the liquid phase pumped out separately.

To implement the method described, the invention provides an apparatus in which a bucket-shaped vessel having an inlet aperture arranged above the vessel bottom in the vessel wall is adapted to be lowered into the well by means of a lifting device, with the lifting device being controllable in dependence upon the liquid level in the well, such that the inlet aperture is below the liquid level by a predetermined amount, and in which a pump is provided to pump out the liquid flowing into the vessel. An apparatus of this type affords a simple means of removing the light phase floating on the groundwater, with the lifting device enabling the vessel to adapt its position to the changes in liquid level easily, in order to prevent the entry of groundwater in the vessel. The separation of water and lighter phase which has already taken place in the ground is thus maintained, permitting a simplified and accelerated decontamination of the groundwater.

Moreover, the vessel may be supported by a vertical guiding means comprising cables fastened in the well.

To make sure that water does not enter the vessel as the layer thickness of the floating phase decreases, the invention may provide a measuring device arranged on the outside of the vessel, the measuring device monitoring the distance of the groundwater surface from the bottom edge of the inlet aperture and issuing, on attainment of a minimum distance, a signal which interrupts the pumping operation out of the vessel. The removal of the liquid phase is thereby interrupted until sufficient liquid phase is supplied again from the layers surrounding the well, providing again the layer thickness required for separate removal. In this arrangement, the capacity of the pump is suitably dimensioned to be lower than the admission capacity at the inlet aperture of the vessel. Thus, the vessel remains filled at all times, so that no further liquid, including water, is admitted when the pump is deactivated.

Another embodiment of the apparatus of the invention may include provisions for a priority control of the lifting device in the sense of a "lifting action" by means of the sensor which responds to the groundwater surface and is arranged on the outside of the vessel below the inlet aperture. When the groundwater surface reaches the sensor, the vessel is lifted by a corresponding amount, thus preventing the entry of water into the vessel. If the layer of the floating phase is thinner than the distance between the inlet aperture and the sensor, the action of removing the floating phase is interrupted at the same time.

To detect the groundwater surface, conductivity sensors may be provided according to the invention. According to the invention, the measuring device for deactivation of the pump may be comprised of two superposed conductivity sensors, with the upper sensor being arranged below the inlet aperture and serving the function of deactivating the pump, while the lower sensor reactivates the pump with an inverse signal.

To control the lifting device in dependence upon the liquid level, that is, upon the level of the floating phase, the invention provides a liquid level measuring device arranged on the outside of the vessel at the level of the inlet aperture. Preferably, the liquid level measuring device comprises an immersion probe whose probe and float means are arranged in a recess on the outside of the vessel wall. The control of the lifting device is accomplished by means of the liquid level measuring device preferably such that the rate of motion of the lifting device is controlled in direct proportion to the deviation of the measured liquid level from the desired liquid level. In this manner, it is possible to make the vessel follow this change sufficiently rapidly, also in the event of an abrupt quick rise of the liquid level in the well.

To pump the liquid phase from the vessel, a submergible pump is preferably arranged in the vessel, the pump outlet being connected, through a preferably flexible discharge conduit, to a collecting tank provided above ground. To ensure that the pump delivers only the light phase, a monitoring device is provided to measure the pressure and the conductivity in the discharge conduit of the pump. If the heavier water phase is delivered, the pressure in the discharge conduit will drop while the conductivity will increase. Both measured values thus enable a reliable monitoring function to be accomplished.

BRIEF DESCRIPTION OF THE DRAWING

The above and other objects, features and advantages of my invention will become more readily apparent from the following description, reference being made to the following drawing which consists of a single FIGURE.

The invention will be described in more detail in the following with reference to an embodiment illustrated in the accompanying drawing. The drawing shows the is a flow diagram showing the schematic structure of an apparatus for the removal of oil which has penetrated the ground and collected on the heavier groundwater.

SPECIFIC DESCRIPTION

The apparatus illustrated comprises a well 1 from which a submergible pump 2 delivers groundwater through a conduit 3 to a groundwater treatment plant not shown. A pressure gauge 4 and a flow meter 5 monitor the discharge stream in the conduit 3. The action of the submergible pump 2 causes the groundwater level to drop in the area of the well 1, producing a gravity flow in the direction of the well 1 which causes the oil 7 floating on the groundwater surface 6 to collect in the well 1.

To be able to pump this oil 7 out of the well separately from the water, a bucket-shaped vessel 8 is provided which is carried by a cable 9 and is vertically movable in the well 1 by means of a motor-driven cable and winch assembly 10. In the proximity of its top edge, the vessel 8 has in its side wall several inlet apertures 11 through which oil is admitted into the vessel. The interior of the vessel 8 accommodates a submergible pump 12 having its outlet connected to a collecting tank 14 through a conduit 13. In the area of the well 1, the conduit 13 is formed by a flexible hose in order to enable the vessel 8 to be vertically movable. The conduit 13 can be shut off by a valve 15. The conduit 13 further accommodates a separator 16 enabling water contained in the discharge stream to be separated and supplied to the groundwater treatment plant.

On the outside of the vessel 8 at the level of the inlet apertures 11, a liquid level measuring device 17 is arranged sensing the position of the liquid level 18 relative to the vessel 8. A control means not shown in greater detail controls the cable and winch assembly 10 on the basis of the values provided by the liquid level measuring device 17, such that the inlet apertures 11 are below the liquid level 18 by a predetermined amount, whereby the oil 7 is admitted in the vessel 8. If the liquid level in the well 1 changes, the liquid level measuring device 17 will detect this condition, and the vessel 8 will be made to follow this change by the cable and winch assembly 10 moving it by a corresponding amount. In this arrangement, the control is designed such that the rate of motion of the cable and winch assembly 10 increases with the departures of the liquid level from the set value progressively increasing, in order to be able to maintain the position of the inlet apertures 11 in the region of the liquid level 18 also upon occurrence of comparatively rapid changes in the liquid level.

The capacity of the submergible pump 12 is selected as to be equal to or smaller than the admission capacity of the inlet apertures 11. In this manner, the vessel 8 remains filled even when the submergible pump 12 is in operation, so that only such amounts of oil are admitted as are drawn by the submergible pump 12. With the operation of the submergible pump 12 progressively reducing the thickness of the floating oil layer, the risk exists that the inlet apertures 11 come to lie below the groundwater level 6, so that also water may enter the vessel 8. To avoid this, a conductivity sensor 19, deactivating the submergible pump 12 on contact with water, is arranged below the inlet apertures 11. Because the thickness of the oil layer 7 is then prevented from being reduced further and the position of the vessel 8 is dependent on the liquid level 18, the groundwater surface is prevented from reaching the inlet apertures 11 after the submergible pump 12 is turned off. Serving to reactivate the submergible pump 12 is the inverse signal of a second conductivity sensor 20 located farther below on the vessel 8.

In order to avoid that in the event of a malfunction water which has entered the vessel 8 is pumped up into the collecting tank 14, a conductivity sensor 21 and a pressure gauge switch means 22 monitor the discharge stream in the conduit 13. A decrease in suction and an increase in conductivity are indicative of an increased water content, resulting in deactivation of the pump 12 and closing of the shut-off valve 15.

Above the submergible pump 2 in the well 1 is equally a conductivity sensor 23 serving to stop the pump 2 on an excessive drop in the liquid level 18 involving the risk of oil being drawn in by the pump 2.

The method and the apparatus described provide a simple means of making use of the fact that water and oil are already separated in the well 1 and of pumping both fluids up to above ground separately. A tank vehicle can transport the oil directly to an oil treatment plant, and the largely oil-free water can be treated in a water treatment plant at low cost.

I claim:

1. A method for removing a liquid phase floating on a surface of a groundwater from a well by a pump mounted in said well and having at least one inlet aperture, said method comprising the steps of:
   (a) continuously pumping out the groundwater from the well, thereby changing a level of a groundwater surface; and (b) simultaneously with but independently of step (a) pumping out a liquid phase floating on said surface by a pump, said pumping of the liquid phase including:
  (b') continuously monitoring a level of said liquid phase and generating a signal corresponding to said level of the liquid phase, and
  (b") adjusting a position of said pump in said well with adjusting means in response to said signal thereby continuously maintaining a position of said aperture between said levels of liquid and said groundwater surface.

2. The method defined in claim 1 further comprising the step of treating said groundwater prior to returning it to the ground.

3. A pollutant recovery assembly for removing a liquid phase floating on a surface of groundwater, said assembly comprising:
  a well extending downwardly from a ground level and having a bottom, said well receiving a ground water and liquid phase floating on a surface of said ground water and having a liquid level above said surface;
  a bucket-shaped vessel suspended in said well and spaced from said bottom, said vessel being provided with at least one inlet aperture receiving said liquid phase;
  a pump operatively connected with said vessel for removing said liquid phase therefrom;
  controlling means for controlling a level of said liquid phase in said well and generating a signal corresponding to said level; and
  adjusting means for displacing said bucket-shaped vessel in response to said signal to continuously maintain a position of said inlet aperture below said liquid level but above said groundwater surface upon removing of said liquid phase by said pump.

4. The assembly defined in claim 3 further comprising vertical guiding cables supporting said vessel in said well.

5. The assembly defined in claim 3 wherein said controlling means measures a distance between said ground water surface and an edge of said inlet aperture.

6. The assembly defined in claim 3 wherein said controlling means includes:
  an immersion probe extending into said vessel through a recess formed in said periphery and lying in a common horizontal plane with said inlet aperture,
  floating means for supporting said probe in said vessel,
  an upper sensor mounted below said inlet aperture for deactivating said pump upon reaching a predetermined liquid level, and
  a lower sensor mounted between said bottom of the vessel and said upper sensor for reactivating said pump.

7. The assembly defined in claim 6, further comprising:
  a tank for collecting said liquid phase and located above the ground level;
  means for measuring a pressure and conductivity of the liquid phase in said flexible conduit; and
  means for shutting off conduit upon exceeding predetermined limits of said pressure and conductivity.

8. The assembly defined in claim 3, further comprising:
  another pump mounted in said well bellow a bottom of the vessel for pumping out the ground water, and
  at least one conductivity sensor in said well operatively connected with said other pump for detecting said groundwater surface.

9. The assembly defined in claim 3 wherein said pump removes said liquid phase at a rate lower than a rate at which said liquid phase passes through said inlet aperture into said vessel.

* * * * *